(12) United States Patent
Janin

(10) Patent No.: US 7,836,930 B2
(45) Date of Patent: Nov. 23, 2010

(54) TIRE WHEREOF AT LEAST ONE BEAD SEAT COMPRISES A RIB

(75) Inventor: Nicolas Janin, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 506 days.

(21) Appl. No.: 11/793,491

(22) PCT Filed: Dec. 6, 2005

(86) PCT No.: PCT/EP2005/056513

§ 371 (c)(1),
(2), (4) Date: Jun. 21, 2007

(87) PCT Pub. No.: WO2006/069895

PCT Pub. Date: Jul. 6, 2006

(65) Prior Publication Data

US 2008/0087364 A1  Apr. 17, 2008

(30) Foreign Application Priority Data

Dec. 24, 2004  (FR) .................................. 04 13956

(51) Int. Cl.
*B60C 15/00*  (2006.01)
*B60C 15/02*  (2006.01)
*B60C 15/06*  (2006.01)

(52) U.S. Cl. .................. 152/539; 152/543; 152/544
(58) Field of Classification Search .................. 152/544, 152/539
See application file for complete search history.

(56) References Cited

U.S. PATENT DOCUMENTS

| | | | |
|---|---|---|---|
| 1,462,517 A * | 7/1923 | Marquette | 152/544 |
| 4,805,682 A * | 2/1989 | Griffiths et al. | 152/544 |
| 5,769,981 A | 6/1998 | Turley et al. | |
| 5,971,047 A | 10/1999 | Drieux et al. | |
| 6,962,184 B2 | 11/2005 | Pereira et al. | |
| 2004/0194865 A1 | 10/2004 | Eynard et al. | |

FOREIGN PATENT DOCUMENTS

| | | | |
|---|---|---|---|
| JP | 02241808 | | 9/1990 |
| JP | 8-216633 | * | 8/1996 |
| WO | WO 9523073 | * | 8/1995 |
| WO | WO 00/06399 | | 2/2000 |

* cited by examiner

*Primary Examiner*—Justin Fischer
(74) *Attorney, Agent, or Firm*—Buchanan Ingersoll & Rooney PC

(57) ABSTRACT

Tire having two beads, at least one bead 1 of which has a seat 11 inclined toward the outside, this seat 11 being extended axially and radially to the outside by a lateral part 12. This bead 1 includes an anchoring device formed from at least one circumferential bead reinforcing element 5 and from a wedge-shaped profiled element 7 made of a rubber compound. A radial carcass reinforcement 4 is anchored in each bead to the circumferential bead reinforcing element 5, this tire being characterized in that the outwardly inclined bead seat 11 includes at least one circumferentially continuous rib 9 making at least one complete revolution, said at least one rib 9 being located axially to the outside of a plane perpendicular to the axis of rotation of the tire and axially tangential to the outside of the circumferential bead reinforcing element 5 in order to create a continuous line of contact pressure equal to or greater than the inflation pressure of the tire.

6 Claims, 2 Drawing Sheets

TIRE WHEREOF AT LEAST ONE BEAD SEAT COMPRISES A RIB

Figure 1:
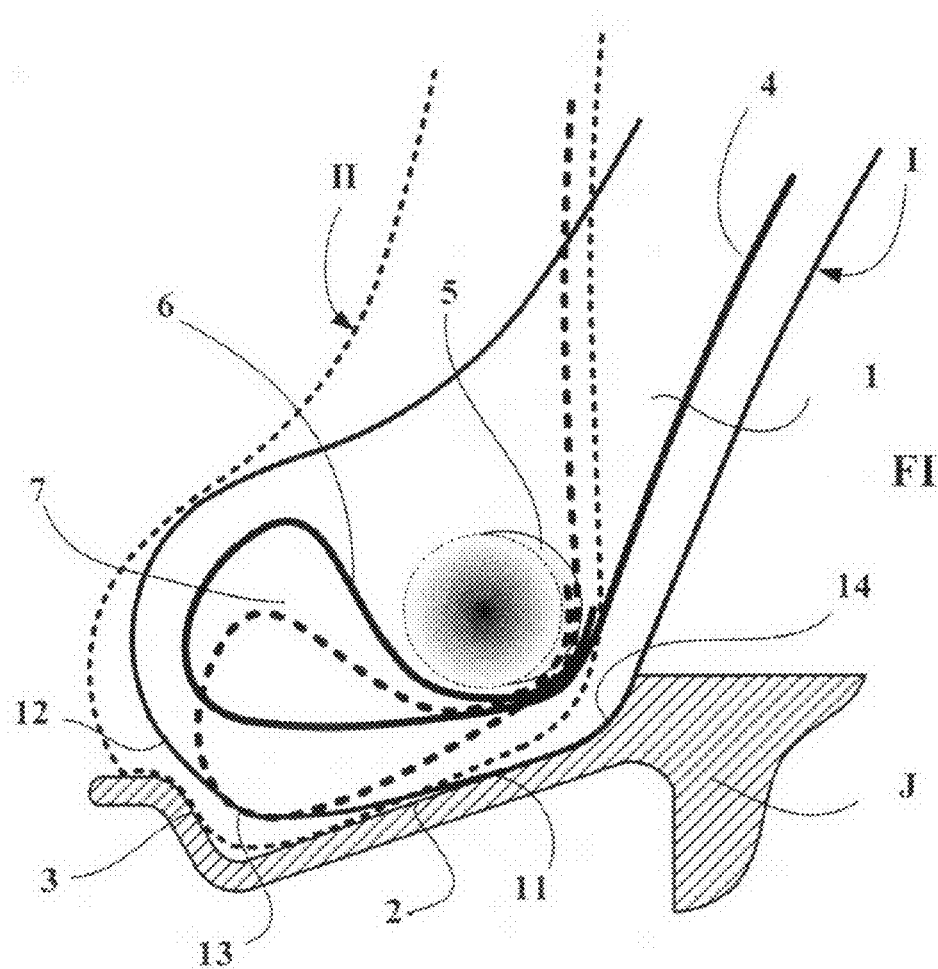

The present invention relates to a tire with a radial carcass reinforcement, said tire being intended to be mounted on a rim having at least one seat which is inclined to the outside and is extended axially to the outside by a projection of small height. The invention relates more particularly to the beads of such a tire.

A tire comprising beads intended to be mounted on a rim at least one seat of which is inclined to the outside has been described for example in international publication WO 95/23073.

The architecture, that is to say the structure, of the beads of such tire assemblies has been described in international publication WO 95/23073 and includes in particular a part forming a "bead heel" intended to be located axially to the inside of the tire and a bead toe intended to be located axially to the outside when the tire is fitted onto its mounting rim. The external profile of each bead comprises a succession of parts, namely a bead seat intended to come into contact with a rim seat and, axially to the outside, a lateral bead part intended to come into contact against a lateral wall of a projection located axially to the outside in the extension of the rim seat.

This tire furthermore includes a carcass reinforcement, the ends of which are anchored in each bead to an anchoring device, said anchoring device being formed from at least one circumferential bead reinforcing element (such as a bead wire or an assembly of yarns or cables wound circumferentially) and from a wedge of a rubber compound having a high hardness and a substantially triangular shape. This wedge is, seen in cross section in a meridional plane (that is to say a plane containing the axis of rotation of the tire), bounded by a radially external lateral face, a radially internal face and, finally, a face joining the two previous faces and located axially to the outside, so that the apex of the wedge, on the opposite side from said lateral face, is located radially toward the inside of the circumferential bead reinforcing element. The carcass reinforcement is anchored at each of its ends to said anchoring device by means of an upturn which is wound, at least partially, around the circumferential bead reinforcing element and is extended in or around the wedge of rubber compound having a high hardness.

It has been found that this type of tire assembly may progressively lose internal pressure. Although such tire assemblies are designed to run at low pressure or even relatively exceptionally at zero pressure, it is however essential for them to be correctly inflated under normal operating conditions. Prolonged running below a certain limit results in damage to the structure of the tire, which may prevent its use after reinflation to a nominal pressure.

Such loss of inflation pressure seems to be the consequence of the beads of the tire moving relative to the mounting rim in each wheel rotation when the tire is under stress in a turn.

In the prior art, difficulties are encountered when fitting a tire on its mounting rim and especially the difficulty of achieving a primary seal allowing thereafter the tire to be inflated. Japanese document 02-241808 describes in particular a tire bead comprising two ribs on the seat of said bead for coming into contact in the initial state and for providing this primary seal. That document does not specify the position relative to the actual structure of the bead nor the contact pressures for solving the problem of loss of inflation pressure during running. As in document WO 00/06399, the ridges on the bead seats are placed beneath the bead wire. It is clear that, in the case of interest to us, it is essential to point out that the tire having outwardly inclined bead seats has nothing to do with the tires of the prior art such as those described in the abovementioned documents, in particular the placement of the beads by mechanical means, which is described in patent U.S. Pat. No. 5,836,366, means that the bead is in contact with the rim right from said placement and therefore that inflation is possible.

The object of the invention is to propose a solution that prevents inflation pressure loss when a tire assembly as described above is running.

The tire comprises, according to the invention:
  two beads, at least one bead of which has an outwardly inclined bead seat, that is to say such that, relative to the axis of rotation of the tire, those points of said seat that are axially furthest toward the inside of the tire are further from the axis of rotation than those points of the same seat that are axially furthest to the outside of the tire, this seat being extended axially and radially toward the outside by a lateral part, the join between this lateral part and the seat being made by a joining part, this bead comprising an anchoring device formed from at least one circumferential bead reinforcing element and from a profiled element made of a rubber compound of high stiffness (i.e. having a modulus at 10% strain of at least 25 MPa) and having a substantially triangular shape bounded by a radially external face, a radially internal face and an axially external lateral face joining the previous two faces and the tip on the opposite side from the axially external face of the profiled element being located radially beneath the circumferential bead reinforcing element;
  a radial carcass reinforcement consisting of a rubber compound reinforced by a plurality of reinforcements (yarns, cables) making, in the tire, an angle equal to or close to 90° to the circumferential direction, this carcass reinforcement being anchored in each bead having an outwardly inclined seat with the circumferential reinforcing element passing radially to the inside of said element and going from the inside of the tire toward the outside in order to form an upturn that extends over or in the profiled element of rubber compound,
  this tire is characterized in that the outwardly inclined bead seat includes at least one circumferentially continuous rib making at least one complete revolution, said at least one rib being located axially to the outside of a plane perpendicular to the axis of rotation of the tire and axially tangential to the outside of the circumferential bead reinforcing element in order to create a continuous line of contact pressure equal to or greater than the inflation pressure of the tire.

The bead seat of the tire according to the invention corresponds to that part of the bead which is intended to come into contact with the seat of a mounting rim, with the exception of the flanges of said rim. This is in general the radially internal part of the circumferential bead reinforcing element (usually called the "bead wire"). This bead seat is extended axially on either side by lateral parts that can come into contact with the rim flanges.

The term "continuous rib" is understood here to mean an overthickness formed in a continuous manner in the circumferential direction on the profile of the bead seat, said overthickness having a width at the base at least 0.5 mm and a height relative to the seat of at least 0.1 mm. Preferably, the width of the base of such a rib is at most 3 mm so as to serve as a pivot point for the cyclic movements of the bead. Preferably, the height of such a rib is such that this does not overly affect the fitting of the tire onto its rim: for private vehicle tire dimensions, a maximum height of the order of 1 millimeter is preferred. The mechanical properties of the constituent materials of the bead have an impact on the minimum height of the rib: this is because, for a first material of lower hardness than that of a second material, it will be necessary to provide a greater rib height.

Preferably, the rib formed on at least one of the beads is axially positioned, relative to the plane perpendicular to the axis of rotation of the tire and axially tangential to the outside of the circumferential bead reinforcing element, at least at a distance equal to half the distance between said plane perpendicular to the axis of rotation and that axially external lateral part of the bead which is intended to come into contact with the hump of the rim. The term "hump" is understood to mean that part axially to the outside of the mounting rim for the tire according to the invention.

Preferably, the meridian profile (i.e. in a plane of section containing the rotation axis) of the rib is of triangular or rectangular shape. Another beneficial shape is a truncated circular shape.

A possible variant consists in reinforcing the rib provided on the seat of a bead with a reinforcement placed in the circumferential direction. This reinforcement (cable, metal wire or textile yarn) may be continuous or discontinuous. The presence of this reinforcement allows the presence of the rib to be preserved, in particular while preventing creep of the rubbery material under the action of contact pressures against the rim. Another variant consists in producing the rib in an elastomer material of appropriate stiffness.

Preferably, the continuous rib is not located in the part where the bead seat joins the lateral part of said bead, so as to be assuredly in contact with the rim seat in usual operating conditions, and especially when in a turn.

Another variant consists in providing this rib only on the bead intended to be placed to the outside of the vehicle.

The invention also relates to a rim having at least one rim seat inclined to the outside according to the definition given above. Specifically, in this case, the rim comprises a rim seat, the axially outermost points of which are located at a distance from the axis of rotation that is less than the distance from the axially innermost points of said seat. This rim furthermore includes, axially to the outside of said outwardly inclined seat, a part forming a hump, a connection part joining said rim seat to said hump. The rim according to the invention includes at least one continuous rib extending in the circumferential direction, this rib forming a ridge on the rim seat and being placed so as to be axially to the outside relative to half the width of said rim seat. The rib profile in cross section is preferably either a triangular shape or a rectangular shape or a truncated circular shape.

Preferably, at least one rib is not in the part joining the rim seat to the hump. This rib, with a width at the base at least equal to 0.5 mm and at most equal to 3 mm and a height at least equal to 0.1 mm and at most equal to 3 mm, may be produced either at the time of manufacture of the rim or afterwards, by attaching material for example. The advantage of a rim according to the invention, apart from the beneficial effect on maintaining inflation pressure, is that it allows the use of tires in which the beads do not have a continuous circumferential rib, and especially tires sold before implementation of the present invention.

The invention also relates to a tire assembly comprising a tire, at least one bead of which has an outwardly inclined bead seat, and a rim, at least one seat of which is inclined to the outside in order to accommodate said bead of the tire, this tire assembly being characterized in that it includes a means for creating a circumferentially continuous line of contact pressure between the bead seat and the rim seat, this pressure being at least equal to the inflation pressure of the tire.

Figure 2:
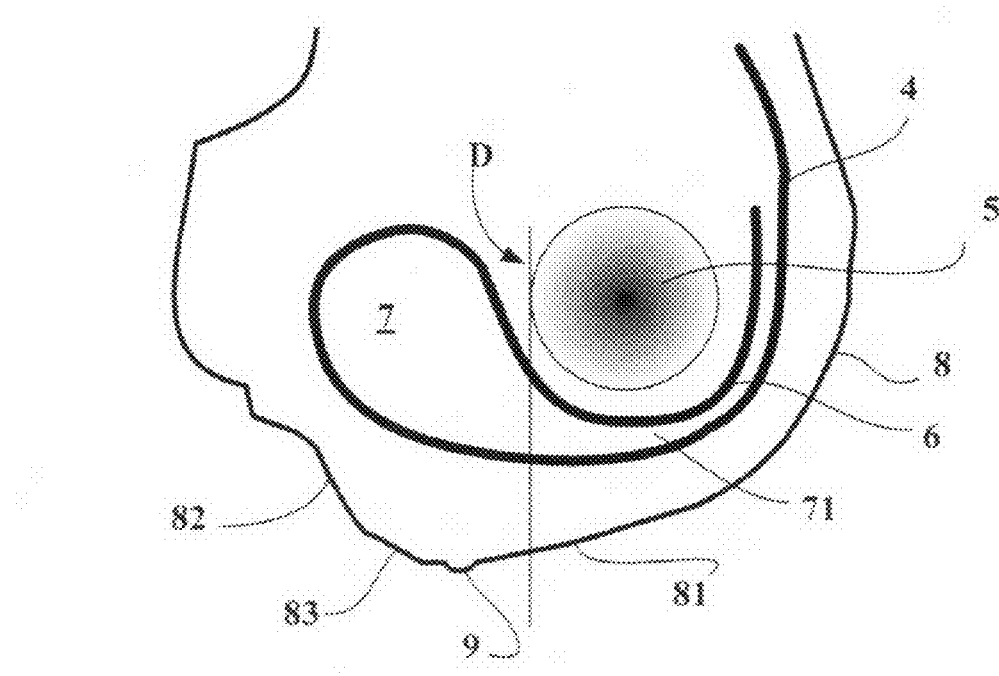
Figure 3:
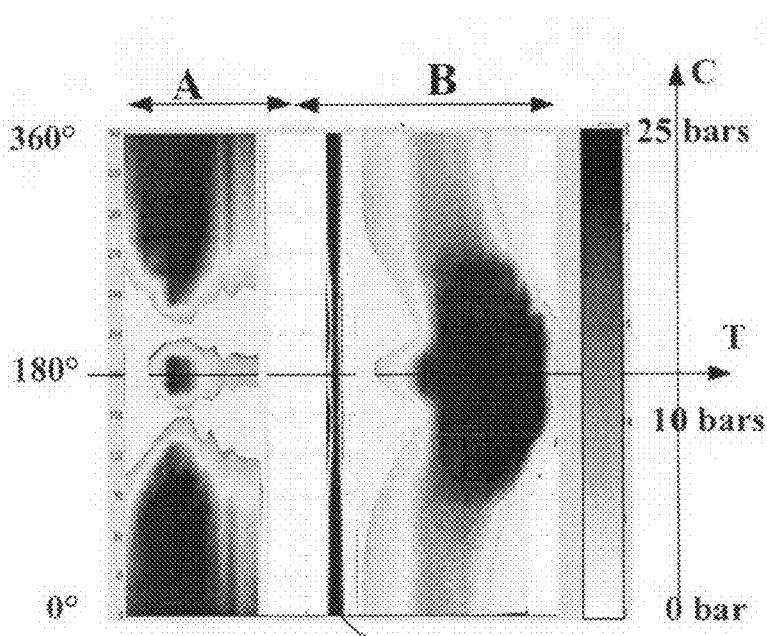
Figure 4:
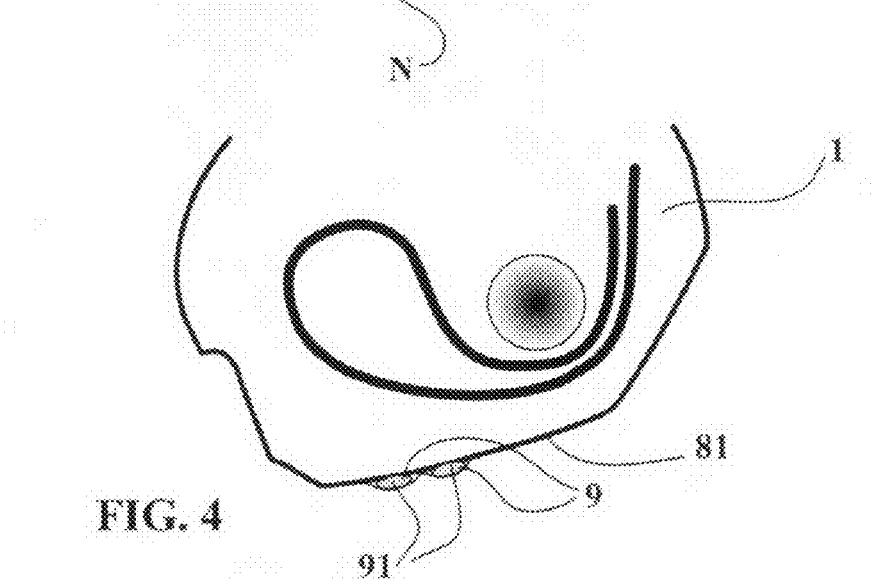
Figure 5:
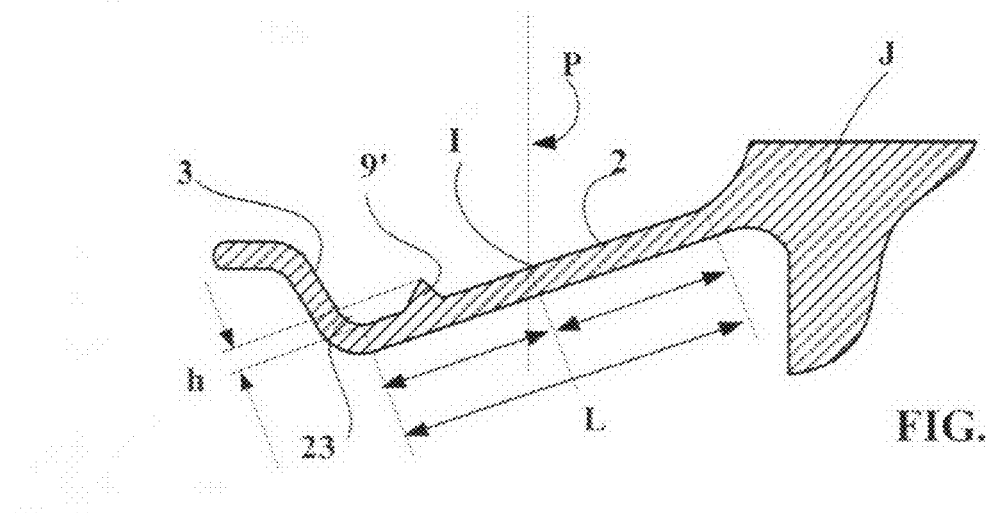

The features of the invention will be better understood with the help of the drawings, appended to the following description, illustrating, nonlimitingly, exemplary embodiments of the invention. These drawings comprise:

FIG. 1, which shows meridional sectional and superposed views of a tire bead according to the prior art, in a configuration when turning;

FIG. 2, which shows a meridional sectional view of a first embodiment of a tire bead according to the invention, this bead having a continuous rib on its seat;

FIG. 3, which shows a recording of the contact pressures between a tire bead according to the invention and its mounting rim;

FIG. 4, which shows a meridional sectional view of another bead embodiment, one of the ribs being reinforced with a continuous textile yarn; and FIG. 5, which shows a meridional sectional view of a rim according to the invention.

To make the following description easier to read, it uses the same reference symbols to denote similar elements whenever these reference symbols denote elements that are identical at least in their function.

FIG. 1 shows, seen in meridional section, and on a vehicle when running and turning to the right relative to the direction of advance of said vehicle, the changes in the geometry of a bead of the prior art. The position chosen corresponds to that of the bead to the outside of the vehicle for the tire located in a front left position.

The term "seen in meridional section" is understood here to mean that the figure is drawn in a plane of section containing the axis of rotation of the tire. Likewise, the expression "radially to the inside of an element" is understood to mean a position located between said element and the axis of rotation of the tire, while the term "axially to the inside" is understood to mean a position located on the side of the cavity limiting the inflation pressure of the tire.

FIG. 1 shows an outwardly inclined seat 2 of a rim J (that is to say the axially outermost points of the rim seat lie on a circle of smaller diameter than the circle on which the axially innermost points lie), the angle of inclination being about 15° to the axis of rotation. This seat 2 is extended axially to the outside by a hump 3 intended to keep a tire bead in place when the tire is running at low or even zero pressure. The seat is joined to the hump by a joining part having the shape of a circular arc joining the seat to the hump tangentially. The rim includes another seat of the same type, but having a different diameter.

Fitted on this seat 2 is a bead 1 of a tire that includes a carcass reinforcement 4 wound partially around a bead wire 5 in order to form an upturn 6. The bead wire 5 may be of the braided type, that is to say a bead wire formed from a core around which are wound one or more yarns or cables in one or more layers. As an equivalent, the bead wire may be replaced with a plurality of cables wound circumferentially and placed on the same side or on either side of the carcass reinforcement, as described for example in application WO 01/39999.

The bead 1 comprises a seat 11 intended to come into contact with a seat 2 of the mounting rim, said bead seat 11 being extended axially and radially to the outside by a lateral part 12 which is itself joined to said seat by a joining part 13.

The size of the tire having the bead shown is a 245-690 R 500 A tire and the dimensions of the mounting rim are 235× 500.

The drawing indicated by the continuous lines corresponds to a meridional section of the bead in the region of the tire in contact with the roadway (position at the vertical of the wheel center). The drawing indicated by the broken lines corresponds to a meridional section of the same bead in that region of the tire diametrically opposite the cross section indicated by the solid lines (opposite the contact area).

By examining these two plots, it may be seen that the same bead is highly stressed when turning to the point of switching from a position I to a position II. In the position I (with the bead drawn as the solid lines), the bead 1 is highly flexed toward the inside of the tire to the point that the axially outer part of the bead seat 11 and the lateral part 12 of said bead are no longer in contact with the rim J, where, if they are still so, it is with very low contact pressures (below the inflation pressure). In position II (broken line drawing), the bead 1 here is highly flexed to the outside of the tire to the point that it is the axially inner part 14 of the bead seat that is practically no longer in contact with the rim 7.

These flexural cycles of the beads on their seats at each revolution of the wheel seem to be at the origin of the progressive loss of inflation pressure of the tire.

FIG. 2 shows a meridional section of a bead 1 of a tire according to the invention, which has the same dimensions as the tire shown in FIG. 1. This bead 1 makes it possible to very substantially reduce the pressure losses in the tire when it is running and more particularly turning.

The bead 1 shown in FIG. 2 includes a bead wire 5 forming a circumferential bead reinforcement around which a radial carcass reinforcement 4 is partially wound (that is to say a reinforcement whose reinforcing members make an angle close to or equal to 90° with the circumferential direction). This carcass reinforcement 4 includes an upturn 6 going around a wedge-shaped profiled element 7 made of a rubber compound, a tip 71 of said profiled element 7 engaging radially under the bead wire 5.

Seen in meridional section, the external geometric profile 8 of this bead comprises a bead seat 81, intended to come into contact with the seat of a mounting rim, a lateral part 82 intended to come into contact with a hump axially to the outside of the rim seat, and a joining profile 83 that joins the bead seat to said lateral part. According to the invention, the bead seat 81 is provided with a rib 9 forming a ridge (that is to say projecting radially toward the inside of the seat 81), said rib being continuous in the circumferential direction so as to provide a continuous line of pressure greater than the internal inflation pressure of the tire.

Furthermore, this rib is placed on the bead seat 81 axially to the outside of a straight line D perpendicular to the axis of rotation of the tire and axially tangential to the outside of the bead wire 5 so as always to be effectively in contact with the rim seat during the observed flexing movements, especially when in a turn.

The term "continuous line of pressure" should be understood here to mean that there is at least one position on the bead seat such that the contact pressure at this point between the bead and the rim over one revolution of the wheel is equal to or greater than the inflation pressure, this being so under usual running conditions when in a turn.

The dimensions of this rib are the following: width at the base about 1 mm, maximum distance from the seat about 0.3 mm. In the meridional plane of section, the profile of this rib 9 reproduces substantially that of a circular arc.

The material in contact with the rim, and constituting inter alia the rib 9, has an extensional modulus at 10% extension of 12 MPa.

In this way, it is permitted to keep a region of the bead seat in permanent contact with the rim seat with an appropriate contact pressure, and to do so whatever the running conditions, with a contact pressure between the bead and the rim sufficient to ensure satisfactory sealing and to make it possible to solve the problem presented in the introduction.

These results were confirmed by tests on a vehicle, as shown in FIG. 3, which shows a recording of the contact pressures between a bead 1 according to the invention as shown in FIG. 2 and its mounting rim J. The part labeled A relates to the recording of the contact pressures of the lateral bead part 82 against the hump 3 of the rim J and the part labeled B relates to the recording of the contact pressures of the bead seat 81 against the seat 2 of the rim J. The recordings were measured over one complete revolution on the bead located to the outside of a vehicle (front axle) under the following running conditions: steady speed of 70 km/h and in a turning configuration equivalent to an approximately constant transverse acceleration of 1 g (i.e. 9.81 m/s$^2$). FIG. 3 shows at all points on. the bead profile (seat and lateral part) the contact pressures over one revolution of the wheel, that is to say over 360° (the direction indicated by the letter C specifically indicates this revolution of the wheel). A contact pressure gray scale is given in the right-hand part, between 0 and 25 bar. The middle part (identified by the letter T) of the recording corresponds to a position in the contact corresponding substantially to the middle of the contact imprint between the tire and the ground. The contact pressures displayed by dark grays are very much higher than the inflation pressure of the tire, while the pressures displayed by light grays (or even whites) are below said inflation pressure.

This recording shows that a very high amplitude of the contact pressures exists in part of the bead seat close to the join between said seat and the lateral bead part. This very large contact pressure variation is created by the swinging movement of the bead on its rim. It also shows that the presence of the continuous rib makes it possible to maintain a continuous contact pressure line that does not have an amplitude of variation comparable to that observed on the other points of the bead seat, this contact pressure here being more than ten times the inflation pressure (here equal to 2.5 bar). This figure also shows that certain regions of the tire bead have no contact pressure with the rim, especially the part that joins the bead seat to the lateral part of said bead.

Preferably, the tires as described, having at least one rib, are placed on a vehicle so that the ribs are located axially to the outside of said vehicle.

In another embodiment of the invention, shown in FIG. 4, the bead is provided on at least one of its seats with at least one rib (in the present case, two ribs 9), each rib 9 being reinforced by a reinforcing element 91, which may be in the form of a cord or an assembly of several cords arranged in the circumferential direction. These reinforcing elements 91 preferably have a stiffness greater than that of the rubber compound of the rib 9 so as to resist creep, that is to say a progressive reduction over time of the thickness of said rib, with consequently a substantial reduction in the contact pressure between said rib and the rim seat. In another embodiment (not shown), the reinforcing elements 91 may be discontinuous in the circumferential direction. These elements 91 may be chosen from textiles, plastic or metallic materials.

In another embodiment of the invention, the contact rib(s) is (are) produced not on the bead seat but directly on at least one of the seats of the mounting rim, and preferably on both of them. FIG. 5 shows a rim of 235×500 size according to the invention which includes an outwardly inclined rim seat 2 extended axially to the outside by a hump 3, a circular arc joining (or connecting) said seat to said hump. A rib 9', continuous over one complete revolution and of triangular geometry, is formed as a ridge on the seat so as to be in permanent contact with a tire bead seat under normal running conditions and in particular when turning. This rib 9' is positioned on the rim seat 2 so as to be axially to the outside of a plane perpendicular to the axis of rotation and passing through the middle I of the rim seat seen in meridional section (this plane is indicated by the straight line P in the plane of FIG. 5). Preferably, this rib 9' is not located in the join between the seat and the axially external hump. The rib 9' may be formed on a rim seat by addition of material machined to the desired shape.

The height of each rib 9' may for example be equivalent to the height of the ribs produced on the bead seats (for example: 0.3 mm).

This embodiment of the invention on a rim is considered to be a form equivalent to the embodiment of the invention on the tire beads in that the same inventive concept is involved, namely the creation of a continuous line of contact pressure between the beads and the rim. The ribs produced directly on the seats of a rim have the benefit of being adapted to tires having no continuous ribs on their seats, and the benefit of being geometrically stable over time.

The invention is not limited to the exemplary embodiments described and shown, it being possible to make various modifications thereto without departing from its scope. In particular, a tire comprising at least one bead provided with at least one continuous rib on at least one of its seats may be fitted onto a rim having at least one rim seat that is also provided with at least one rib (in this case, it may be preferable for the ribs to be offset).

The invention claimed is:

1. A tire intended to be inflated to an operating inflation pressure and comprising:
   two beads, at least one bead of which has an outwardly inclined bead seat that is to say such that, relative to the axis of rotation of the tire, those points of said seat that are axially furthest toward the inside of the tire are further from the axis of rotation than those points of the same seat that are axially furthest to the outside of the tire, this comprising an anchoring device formed from at least one circumferential bead reinforcing element and from a profiled element made of a rubber compound of high stiffness and having a substantially triangular shape bounded by a radially external face, a radially internal face, an axially external lateral face joining the previous two faces, and a tip on the opposite side from the axially external face of the profiled element, the tip being located radially internal to the circumferential bead reinforcing element;
   a radial carcass reinforcement comprising a rubber compound reinforced by a plurality of reinforcements making, in the tire, an angle equal to or close to 90° to the circumferential direction, this carcass reinforcement being anchored in each bead having an outwardly inclined seat with an anchoring device passing radially to the inside of the circumferential bead reinforcing element and going from the inside of the tire toward the outside in order to form an upturn that extends over or in the profiled element of rubber compound,
   at least one bead seat including at least one circumferentially continuous rib making at least one complete revolution, said at least one rib being located axially to the outside of a plane perpendicular to the axis of rotation of the tire and axially tangential to the outside of the circumferential bead reinforcing , the rib adapted to create a continuous line of contact pressure, between the bead seat and a rim seat, equal to or greater than the inflation pressure of the tire, the remainder of the at least one bead seat located axially to the inside of said plane being free of circumferential ribs, wherein at least one continuous rib is reinforced by a circumferential reinforcement placed in said rib.

2. The tire as claimed in claim 1, wherein the width of the base of the rib is at least 0.5 mm and at most 3.0 mm, and the height of the rib relative to the seat is at least 30 0.1 mm and at most 1.0 mm.

3. The tire as claimed in either of claims 1 and 2, wherein the rib formed on at least one of the beads is axially positioned, relative to the plane perpendicular to the axis of rotation of the tire and axially tangential to the outside of the circumferential bead reinforcing element, at least at a distance equal to half the distance between said plane perpendicular to the axis of rotation and that axially external lateral part of the bead which is adapted to come into contact with a rim hump.

4. The tire as claimed in claim 1, wherein the circumferential reinforcement is discontinuous in the circumferential direction.

5. The tire as claimed in claim 1, wherein at least one rib is positioned so as to be axially to the outside of a vehicle when said tire is fitted onto said vehicle.

6. A tire intended to be inflated to an operating inflation pressure and comprising:
   two beads, at least one bead of which has an outwardly inclined bead seat that is to say such that, relative to the axis of rotation of the tire, those points of said seat that are axially furthest toward the inside of the tire are further from the axis of rotation than those points of the same seat that are axially furthest to the outside of the tire, this comprising an anchoring device formed from at least one circumferential bead reinforcing element and from a profiled element made of a rubber compound of high stiffness and having a substantially triangular shape bounded by a radially external face, a radially internal face, an axially external lateral face joining the previous two faces, and a tip on the opposite side from the axially external face of the profiled element, the tip being located radially internal to the circumferential bead reinforcing element;
   a radial carcass reinforcement comprising a rubber compound reinforced by a plurality of reinforcements making, in the tire, an angle equal to or close to 90° to the circumferential direction, this carcass reinforcement being anchored in each bead having an outwardly inclined seat with an anchoring device passing radially to the inside of the circumferential bead reinforcing element and going from the inside of the tire toward the outside in order to form an upturn that extends over or in the profiled element of rubber compound,
   at least one bead seat including at least one circumferentially continuous rib making at least one complete revolution, said at least one rib being located axially to the outside of a plane perpendicular to the axis of rotation of the tire and axially tangential to the outside of the circumferential bead reinforcing , the rib adapted to create a continuous line of contact pressure, between the bead seat and a rim seat, equal to or greater than the inflation pressure of the tire, the remainder of the at least one bead seat located axially to the inside of said plane being free of circumferential ribs, wherein the meridian profile of the rib is rectangular.

* * * * *